No. 666,581. Patented Jan. 22, 1901.
M. WAGNER.
ACETYLENE GAS GENERATOR.
(Application filed Apr. 5, 1900.)
(No Model.)
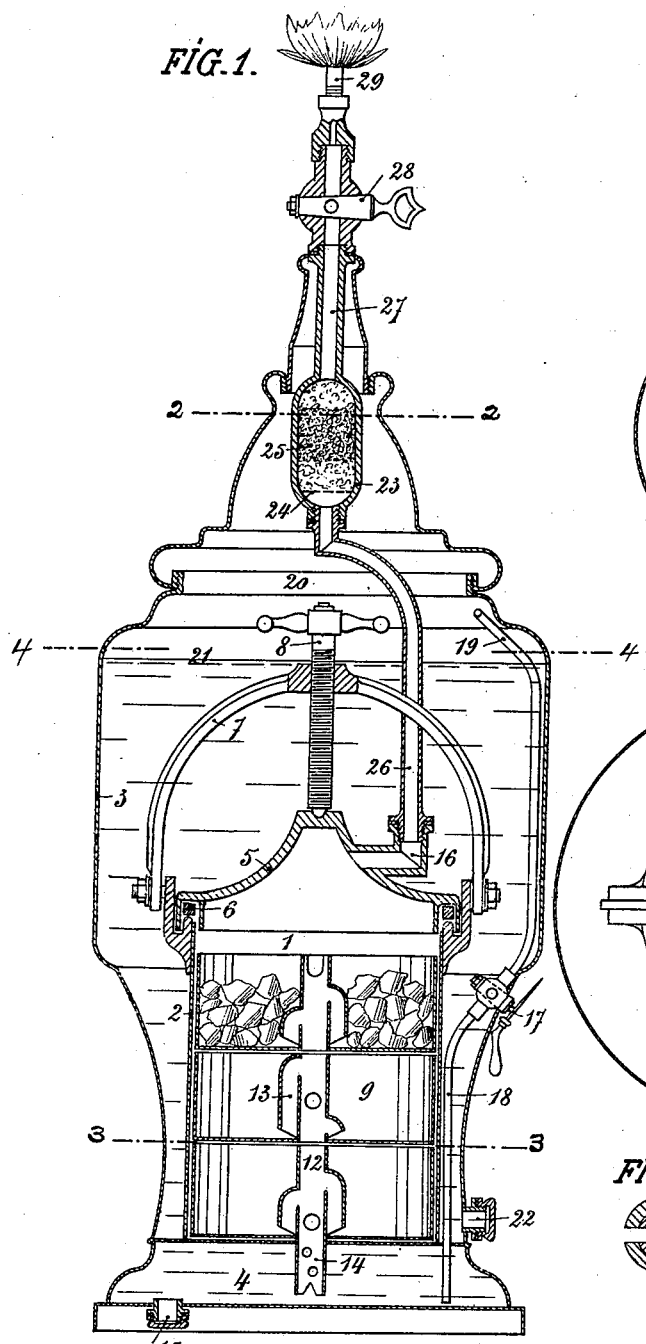

UNITED STATES PATENT OFFICE.

MARTIN WAGNER, OF PARIS, FRANCE.

ACETYLENE-GAS GENERATOR.

SPECIFICATION forming part of Letters Patent No. 666,581, dated January 22, 1901.

Application filed April 5, 1900. Serial No. 11,707. (No model.)

*To all whom it may concern:*

Be it known that I, MARTIN WAGNER, manufacturer, a citizen of the Republic of France, residing at Paris, France, (whose postal address is 84 Rue de la Folie-Méricourt, Paris,) have invented certain new and useful Improvements in Acetylene-Gas Generators, of which the following is a specification.

My invention relates to acetylene-gas-generating lamps.

One object of my invention is the provision of means for securing contact of water with relatively small volumes of calcium carbid successively, thus insuring gentle and gradual generation of the gas.

Another object of my invention is the provision of means for controlling admission of water to the carbid-chambers, while at the same time insuring a safety-outlet whether the admission-valve be opened or closed.

My invention is illustrated in the accompanying drawings, wherein—

Figure 1 is a vertical section of my improved lamp. Fig. 2 is a horizontal section on the line 2 2 in Fig. 1. Fig. 3 is a horizontal section on the line 3 3 in Fig. 1. Fig. 4 is a horizontal section on the line 4 4 in Fig. 1; and Figs. 5 and 6 are detail views showing the relative positions of the valve for admission and shutting off of the water, respectively.

The gas-generator is shown at 1 in the form of a cylinder whose vertical wall 2 is contained within the outer casing 3 of the lamp. This casing comprises the main reservoir immediately around and above the generator 1 and the separate compensating chamber 4 directly beneath said generator.

The generator is closed by a dome-shaped cover 5, made air-tight by means of a proper gasket 6 and held in place by the pivoted bail 7 and screw 8.

The lower part of the generator-space is occupied by successive trays 9, resting one upon the other. Each tray is provided with a number of compartments 10, adapted to contain lumps of calcium carbid 11. Each tray 9 is provided with a central tube 12, having passages 13 communicating with the respective compartments and opening at different levels into the central tube. The tubes communicate with each other and with a final perforated entrance-tube 14, whereby a vertical passage is provided from the compensating chamber 4 to the top of the gas-generator.

The chamber 4 is provided with an aperture 15 for purposes of cleaning.

Leading from the top of the generator is the gas-conduit 16.

A three-way cock 17 communicates with the chamber 4 by means of the pipe 18 and by means of the pipe 19 with a point near the top 20 of the main reservoir. As shown in Figs. 5 and 6, the casing of the cock 17 has a lateral transverse opening intended to be submerged by water, whose normal level is indicated by the line 21 in Fig. 1. This opening is shown as a small circle in the valve-casing near 17 in Fig. 1. The core of the valve 17 is pierced with a through-passage intended to always register with the abutting pipes 18 and 19, and into this through-opening a lateral branch extends, which branch may be brought opposite the submerged hole in the valve-casing, as shown in Fig. 5, or may be turned away therefrom, as in Fig. 6.

The main reservoir is normally filled with water 21, which may be drawn off when desired by the opening 22.

The purifier is shown at 23, and consists of a suitably-shaped chamber supported above the reservoir, within which is placed a wire screen or perforated plate 24, supporting a body of purifying material, as 25, preferably powdered charcoal and calcium chlorid. The gas generated at 1 passes out at 16 and through the pipe 26 to the purifier. There, passing through the material 25, it reaches the pipe 27, whence it may be admitted by the cock 28 to the burner 29.

The operation of my device is as follows: The various compartments 10 are charged and the trays placed upon each other within the generator 1, as shown, the various central tubes 12 being made to register throughout. The cover 5 is then screwed down and the reservoir filled to the level 21 with water, the cock 17 being in the position shown in Fig. 6. When it is desired to light the lamp, the cock 17 is first turned to the position shown in Fig. 5, thus admitting water through the submerged lateral opening to the chamber 4 and thence by the pipes 14 and 12 to the compartments 10 one after the other as the rising water reaches the successively-higher openings 13. As soon as the water comes in contact with the calcium carbid in the first compartment, gas is generated, which, finding its way into the top of the generator and connected pipes, creates a back pressure which soon stops further advent of liquid. Any excessive pressure acts to force water back through the pipes 18 and 19 and through both the lateral opening and the through-aperture in the valve 17. The generation of gas being thus inaugurated, the lamp can be lighted on turning the cock 28. It is evident that in proportion as the carbid becomes spent in successively-higher compartments 10 the water will be admitted to rise higher in the tubes 12 until all the carbid is spent. In putting out the light the valve 17 is closed (see Fig. 6) before the cock 28, and finally when the flame has nearly or quite gone out the cock 28 is closed. As may be seen in Fig. 6, the through-passage in the valve 17 permits compensation of excessive pressures developed after said valve is closed, since it still permits water from the chamber 4 to find its way to the upper reservoir through the pipe 19.

It will be understood that the precise shapes and sizes of the various parts of my apparatus may be considerably varied without departing from the spirit of my invention.

What I claim is—

1. In an acetylene-lamp, a water-reservoir, a generator, a compensating chamber adapted to hold water and gas, a pipe extending from said compensating chamber through said water-reservoir and terminating above the level of the water in the latter, and a submerged valve in said pipe for admitting water when opened, said valve being provided with a through-passage which maintains an open outlet from the compensating chamber whether said valve be opened or closed.

2. In an acetylene-lamp, a generator, a compensating chamber beneath the same, a feeding and relief pipe leading up from said chamber and a three-way valve in said pipe the core of which has a transverse passage for admitting water, and a through-passage for maintaining the relief-pipe open from end to end in either extreme position of said valve.

In testimony whereof I have hereunto signed my name, this 23d day of March, 1900, in the presence of two subscribing witnesses.

MARTIN WAGNER.

Witnesses:
AUGUSTE TOURNOL,
FERNAND DESHARS.